United States Patent Office 2,714,604
Patented Aug. 2, 1955

2,714,604

PRODUCTION OF OXYGENATED HYDROCARBONS

Robert L. Mitchell and Oren V. Luke, Corpus Christi, Tex., assignors to Celanese Corporation of America, New York, N. Y., a corporation of Delaware No Drawing. Application September 4, 1952, Serial No. 307,907

11 Claims. (Cl. 260—451)

This invention relates to the production of oxygenated hydrocarbons and relates more particularly to an improved process for the production of oxygenated hydrocarbons by the vapor phase partial oxidation of hydrocarbon materials.

The production of oxygenated hydrocarbons by the vapor phase partial oxidation of hydrocarbon materials has long been known. In carrying out this process, a mixture of the hydrocarbon materials and oxygen is heated to an elevated temperature, somewhat below the temperature at which the reaction will take place in an uncontrolled manner and with great rapidity, and the heated reaction mixture is passed through a reaction line to cause the reaction to proceed. The reaction mixture is then cooled and the oxygenated hydrocarbons are separated therefrom.

When the progress of the reaction is followed closely, it is found that after the reaction mixture is heated to an elevated temperature there is an induction period during which time little or no oxidation of the hydrocarbon materials takes place. The reaction then "kicks off" and goes forward rapidly until all the available oxygen is utilized. After the reaction kicks off there is a rapid rise in the temperature of the reaction mixture owing to the liberation of large quantities of heat by the exothermic oxidation reaction. The length of the induction period varies inversely with the temperature to which the reaction mixture is heated; being quite short when the mixture is heated to higher temperatures and increasing in length as the temperature to which the reaction mixture is heated is lowered. Heating of the reaction mixture to higher temperatures to shorten the induction period is advantageous in that it permits reducing the size of the reaction line for a given rate of flow of the reaction mixture. However, larger amounts of fuel are required to heat the reaction mixture to these higher temperatures. In addition, when the reaction mixture is heated to these higher temperatures, the final temperature which the reaction mixture reaches at the end of the reaction will be higher so that a greater cooling capacity will be required to lower the temperature of said mixture to permit the oxygenated hydrocarbons to be recovered therefrom. The higher final temperatures will also tend to accelerate the rate at which decomposition reactions take place in the reaction mixture with the production of materials such as carbon monoxide, carbon dioxide and water which have little or no commercial value. In addition, the higher final temperatures will tend to cause the production of certain substances, such as methane and the like which are of lower economic value in the oxidation process since they do not oxidize readily to produce oxygenated hydrocarbons. On the other hand, heating of the reaction mixture to lower temperatures is undesirable in that such temperatures involve relatively long induction periods so that the reaction line must be made uneconomically large.

It is an important object of this invention to provide a process for the production of oxygenated hydrocarbons which will be free from the foregoing and other disadvantages and which will be especially simple and efficient in operation.

A further object of this invention is to provide a process for the production of oxygenated hydrocarbons by the partial oxidation of hydrocarbon materials according to which the induction period following the heating of the reaction mixture may be shortened materially without the necessity of heating the said mixture to higher temperatures.

Another object of this invention is to provide a process for the production of oxygenated hydrocarbons by the partial oxidation of hydrocarbon materials according to which there is introduced into a reaction mixture containing oxygen and hydrocarbon materials a reacting mixture of oxygen and hydrocarbon materials whereby the induction period following the heating of the reaction mixture is shortened materially.

Other objects of this invention will be apparent from the following detailed description and claims.

According to the present invention, a main stream comprising a reaction mixture containing oxygen and hydrocarbon materials is heated to an elevated temperature, but below that at which an oxidation reaction will take place therein in an uncontrolled manner and with great rapidity. There is then introduced into the heated reaction mixture during the induction period an auxiliary stream comprising a mixture of oxygen and hydrocarbon materials which has been heated to an elevated temperature and in which the induction period has passed so that the oxidation reaction is proceeding rapidly. The introduction of the auxiliary stream triggers the reaction in the main stream and greatly shortens the induction period before the reaction in the main stream kicks off. As a result, it is possible, when the reaction mixture in the main stream is heated to a given temperature, through the introduction of the auxiliary stream to reduce the size of the reaction line. A more important advantage of the process of the instant invention is that through the introduction of the auxiliary stream, it is possible to carry out the reaction in the main stream at lower temperatures without the use of reaction lines of excessive length. Thus, when an auxiliary stream is introduced into the main stream it is possible to lower the temperature to which the reaction mixture is heated by from about 50 to 100° F., or even more for a reaction line of given size. This produces a corresponding reduction in the maximum temperature to which the reaction mixture will rise during the oxidation reaction. As a result, there is a saving not only in the amount of fuel needed to heat the reaction mixture prior to the reaction, but also in the cooling capacity needed to cool the mixture after the reaction to permit the recovery of the oxygenated hydrocarbons therefrom. The reduction in the maximum temperature to which the reaction mixture will rise during the oxidation reaction also decreases the rate at which decompositions reactions take place thereby improving the overall efficiency of the process.

In carrying out the oxidation reaction, the hydrocarbon materials may include, for example, ethane, propane, butane, pentane and the like, as well as the corresponding unsaturated hydrocarbons such as ethylene, propylene, butylene, pentylene and the like, either alone or in admixture with each other. The hydrocarbon materials may be mixed with from about 2 to 25 mole per cent of oxygen in the form of air, oxygen enriched air, pure oxygen or the like. The lower percentages of oxygen give a lower conversion of the hydrocarbon materials but a higher efficiency since the formation of degradation products is reduced, and the higher percentages of oxygen give a higher conversion of the hydrocarbon materials but a lower efficiency since more degradation products are produced. Preferably, the hydrocarbon materials and oxygen are mixed and then heated, but they may be heated separately and then mixed one with the other. The temperature to which the reaction mixture in the main stream is heated may range from about 500 to 700° F., or preferably between about 525 and 625° F. The pressure at which the reaction is carried out may range from about 20 to 300 pounds per square inch gauge.

Into the heated main stream of reaction mixture, there is introduced, during the induction period of the oxidation reaction, an auxiliary stream comprising a mixture of hydrocarbon materials and oxygen, which auxiliary stream has been heated to an elevated temperature and in which the induction period has passed so that the oxidation is proceeding therein at a rapid rate. The hydrocarbon materials in the auxiliary stream may be the same as those in the main stream or they may be different. The hydrocarbon materials in the auxiliary stream may be mixed with from about 2 to 25 mole per cent of oxygen and heated to an elevated temperature in the same manner as the main stream. It may, however, be desirable to heat the auxiliary stream to a somewhat higher temperature of between about 600 and 1200° F. to cause the reaction in said auxiliary stream to proceed with greater rapidity at the time it is introduced into the main stream. In this way, the induction period in the reaction mixture in the main stream will be reduced to a minimum. Despite the use of these extremely high temperatures, there is little loss of material on an overall basis as the result of degradation, both because the amount of material in the auxiliary stream normally represents only a fraction of that in the main stream and because of the lesser tendency toward the formation of degradation products in the main stream. The auxiliary stream may even be burned with a flame as it enters the main stream, in which case all or a part of the heating of the auxiliary stream may take place in the flame.

The hydrocarbon materials in the auxiliary stream advantageously constitute between about 5 and 20 mole per cent of the hydrocarbon materials in the main stream. Smaller quantities of hydrocarbon materials are relatively ineffective in reducing the induction period whereas larger quantities of hydrocarbon materials are inefficient since they do not offer a materially greater reduction in the induction period than is obtained when operating within the limits specified. The auxiliary stream, when no burning takes place, will be at a temperature of between about 700 and 1200° F. when it is introduced into the main stream in which the oxidation reaction is in its induction period. If desired, the auxiliary stream may comprise a portion of the main stream which has been diverted therefrom, or it may be an entirely separate stream.

Following the introduction of the auxiliary stream into the main stream, the oxidation reaction will begin in the main stream as it flows through the reaction line, after a much shortened induction period and will continue until all the available oxygen has been utilized. The reaction mixture is then cooled, as by quenching with an aqueous medium, and the oxygenated hydrocarbons are recovered therefrom. The unreacted residue may be recycled to utilize the hydrocarbons therein. To prevent the build-up in the reaction mixture of excessive quantities of diluent gases such as nitrogen, carbon monoxide, carbon dioxide or the like, the unreacted residue or a portion thereof may be passed through a hydrocarbon recovery system where the useful hydrocarbons are recovered for further use while the diluents and inert gases are discarded.

The following examples are given to illustrate this invention further:

*Example I*

A stream of normal butane is mixed with 0.65 volume of air per volume of butane, at a pressure of 100 pounds per square inch gauge, and the mixture is passed through a furnace and into a reaction line. A portion of the mixture, constituting 20% of its volume, is withdrawn from the main stream, passed through an auxiliary furnace where it is heated to a temperature of 650° F. and then passed through a short reaction line. When the temperature of said portion begins to rise rapidly, it is injected as an auxiliary stream into the main stream at the point where said main stream emerges from the furnace. When no auxiliary stream is introduced into the reaction line, it is necessary to heat the reaction mixture to a temperature of 625° F. in the furnace to insure that the reaction will go to completion and the reaction mixture reaches a maximum temperature of 825° F. With the introduction of the auxiliary stream, it is only necessary to heat the reaction mixture to a temperature of 575° F. to insure that the reaction will go to completion, and the reaction mixture reaches a maximum temperature of only 800° F. Following the completion of the reaction, the reaction mixture is quenched with an aqueous medium and the oxygenated hydrocarbons are recovered therefrom while the unreacted residue is recycled.

*Example II*

A stream of normal butane is mixed with 0.65 volume of air per volume of butane, at a pressure of 100 pounds per square inch gauge, and the mixture is passed through a furnace and into a reaction line. A stream containing methane and air in a 6 to 1 volume ratio and having a total volume of 11% of that of the butane and air in the main stream is passed through a furnace where it is heated to a temperature of 850° F. and then into a reaction line. After the usual induction period, reaction begins between the methane and air and when the temperature of this stream has reached 1050° F. it is introduced as an auxiliary stream into the main stream as the main stream leaves the furnace, and at the very beginning of the induction period. With the introduction of the auxiliary stream it is possible to reduce the heating of main stream in the furnace so that the main stream reaches a maximum temperature of only 780° F., during the reaction whereas, when no auxiliary stream is used, the main stream must be heated to a higher temperature in the furnace so that the main stream reaches a temperature of 825° F. during the reaction. Following the completion of the reaction, the reaction mixture is quenched with an aqueous medium and the oxygenated hydrocarbons are recovered therefrom while the unreacted residue is recycled.

It is to be understood that the foregoing detailed description is given merely by way of illustration and that may variations may be made therein without departing from the spirit of our invention.

Having described our invention, what we desire to secure by Letters Patent is:

1. In a process for the production of oxygenated hydrocarbons by the vapor phase partial oxidation of hydrocarbon materials wherein a main stream comprising a reaction mixture containing oxygen and hydrocarbon materials is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials which has been heated to an elevated temperature and in which the induction period has passed so that the oxidation reaction is proceeding in the auxiliary stream at a rapid rate.

2. In a process for the production of oxygenated hydrocarbons by the vapor phase partial oxidation of hydrocarbon materials wherein a main stream comprising a reaction mixture containing oxygen and hydrocarbon materials is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials which has been heated to an elevated temperature and in which the induction period has passed so that the oxidation reaction is proceeding in the auxiliary stream at a rapid rate, the hydrocarbon materials in the auxiliary stream being between about 5 and 20 mole per cent of the hydrocarbon materials in the main stream.

3. In a process for the production of oxygenated hydrocarbons by the vapor phase partial oxidation of hydrocarbon materials wherein a main stream comprising a reaction mixture containing oxygen and hydrocarbon materials is heated to an elevated temperature of between about 500 and 700° F. and below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials which has been heated to an elevated temperature of between about 600 and 1200° F. and in which the induction period has passed so that the oxidation reaction is proceeding in the auxiliary stream at a rapid rate.

4. In a process for the production of oxygenated hydrocarbons by the vapor phase partial oxidation of hydrocarbon materials wherein a main stream comprising a reaction mixture containing oxygen and hydrocarbon materials, said mixture containing between about 2 and 25 mole per cent of oxygen on the hydrocarbon, is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials, said mixture containing between about 2 and 25 mole per cent of oxygen on the hydrocarbons, which auxiliary stream has been heated to an elevated temperature and in which the induction period has passed so that the oxidation reaction is proceeding in the auxiliary stream at a rapid rate.

5. In a process for the production of oxygenated hydrocarbons by the vapor phase partial oxidation of hydrocarbon materials at a pressure of between about 20 and 300 pounds per square inch gauge wherein a main stream comprising a reaction mixture containing oxygen and hydrocarbon materials is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials which has been heated to an elevated temperature and in which the induction period has passed so that the oxidation reaction is proceeding in the auxiliary stream at a rapid rate.

6. In a process for the production of oxygenated hydrocarbons by the vapor phase partial oxidation of hydrocarbon materials wherein a main stream comprising a reaction mixture containing oxygen and hydrocarbon materials, said mixture containing between about 2 and 25 mole per cent of oxygen on the hydrocarbons, is heated to an elevated temperature of between about 500 and 700° F. and below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials, said mixture containing between about 2 and 25 mole per cent of oxygen on the hydrocarbons, which has been heated to an elevated temperature of between about 600 and 1200° F. and in which the induction period has passed so that the oxidation reaction is proceeding in the auxiliary stream at a rapid rate.

7. In a process for the production of oxygenated hydrocarbons by the vapor phase partial oxidation of hydrocarbon materials wherein a main stream comprising a reaction mixture containing oxygen and hydrocarbon materials, said mixture containing between about 2 and 25 mole per cent of oxygen on the hydrocarbons, is heated to an elevated temperature of between about 500 and 700° F. and below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials, said mixture containing between about 2 and 25 mole per cent of oxygen on the hydrocarbons, which has been heated to an elevated temperature of between about 600 and 1200° F. and in which the induction period has passed so that the oxidation reaction is proceeding in the auxiliary stream at a rapid rate, the hydrocarbon materials in the auxiliary stream being between about 5 and 20 mole per cent of the hydrocarbon materials in the main stream.

8. In a process for the production of oxygenated hydrocarbons by the vapor phase partial oxidation of hydrocarbon materials at a pressure of between about 20 and 300 pounds per square inch gauge wherein a main stream comprising a reaction mixture containing oxygen and hydrocarbon materials, said mixture containing between about 2 and 25 mole per cent of oxygen on the hydrocarbons, is heated to an elevated temperature of between about 525 and 625° F. and below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials, said mixture containing between about 2 and 25 mole per cent of oxygen on the hydrocarbons, which has been heated to an elevated temperature of between about 600 and 1200° F. and in which the induction period has passed so that the oxidation reaction is proceeding in the auxiliary stream at a rapid rate, the hydrocarbon materials in the auxiliary stream being between about 5 and 20 mole per cent of the hydrocarbon materials in the main stream.

9. In a process for the production of oxygenated hydrocarbons by the vapor phase partial oxidation of butane wherein a main stream comprising a reaction mixture containing oxygen and butane is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and hydrocarbon materials which has been heated to an elevated temperature and in which the induction period has passed so that the oxidation reaction is proceeding in the auxiliary stream at a rapid rate.

10. In a process for the production of oxygenated hydrocarbons by the vapor phase partial oxidation of butane wherein a main stream comprising a reaction mixture containing oxygen and butane is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and butane which has been heated to an elevated temperature and in which the induction period has passed so that the oxidation reaction is proceeding in the auxiliary stream at a rapid rate.

11. In a process for the production of oxygenated hydrocarbons by the vapor phase partial oxidation of butane wherein a main stream comprising a reaction mixture containing oxygen and butane is heated to an elevated temperature below that at which the oxidation reaction will take place in an uncontrolled manner and the oxidation reaction proceeds at a rapid rate after an induction period, the improvement which comprises introducing into the main stream during the induction period an auxiliary stream comprising a mixture of oxygen and methane which has been heated to an elevated temperature and in which the induction period has passed so that the oxidation reaction is proceeding in the auxiliary stream at a rapid rate.

References Cited in the file of this patent

UNITED STATES PATENTS

| | | |
|---|---|---|
| 1,735,486 | Young | Nov. 12, 1929 |
| 1,814,621 | Dearborn et al. | July 14, 1931 |
| 2,226,378 | King et al. | Dec. 24, 1940 |
| 2,265,948 | Loder | Dec. 9, 1941 |
| 2,398,612 | Bergsteinsson et al. | Apr. 16, 1946 |
| 2,475,605 | Prutton et al. | July 12, 1949 |
| 2,660,032 | Rosenthal | Nov. 24, 1953 |